US012290019B2

(12) United States Patent
Maro (10) Patent No.: US 12,290,019 B2
(45) Date of Patent: May 6, 2025

(54) ROW UNIT MOUNTING SYSTEM (71) Applicant: DEERE & COMPANY, Moline, IL (US)

(72) Inventor: Randall A Maro, Davenport, IA (US)

(73) Assignee: Deere & Company, Moline, IL (US)

(*) Notice: Subject to any disclaimer, the term of this patent is extended or adjusted under 35 U.S.C. 154(b) by 788 days.

(21) Appl. No.: 17/305,186

(22) Filed: Jul. 1, 2021

(65) Prior Publication Data
US 2022/0030762 A1 Feb. 3, 2022

Related U.S. Application Data (60) Provisional application No. 63/058,646, filed on Jul. 30, 2020.

(51) Int. Cl.
A01C 7/20 (2006.01)
A01C 7/16 (2006.01)
(52) U.S. Cl.
CPC .............. *A01C 7/201* (2013.01); *A01C 7/163* (2013.01); *A01C 7/208* (2013.01)
(58) Field of Classification Search
CPC ......... A01C 7/201; A01C 7/163; A01C 7/208; A01C 7/20; A01C 7/00; A01C 7/16; A01C 7/08
See application file for complete search history.

(56) References Cited

U.S. PATENT DOCUMENTS

| 2,546,461 A * | 3/1951 | Lewis ............... A01B 35/18 172/776 |
| 10,561,057 B2 | 2/2020 | Gadzella et al. |
| 2018/0146609 A1 | 5/2018 | Andrews |

FOREIGN PATENT DOCUMENTS

| AR | 0098400 A1 | 5/2016 |
| EP | 3228170 A1 | 10/2017 |
| WO | WO2011119093 A1 | 9/2011 |

OTHER PUBLICATIONS

Extended European Search Report and Written Opinion issued in European Patent Application No. 21188275.8, dated Jan. 4, 2022, in 09 pages.

* cited by examiner

*Primary Examiner* — Christopher J. Novosad (57) ABSTRACT

Apparatuses, systems, and methods for coupling a row unit to a frame of an agricultural implement include a row unit, such as a planter row unit. The row unit may be coupled to a frame of an agricultural planter by engagement between mounting features of the planter row unit to one or more rails formed on a frame of the agricultural planter. One or more of the mounting features may be movable relative to one or more other mounting features in order to secure the planting row unit to the frame of the agricultural planter.

21 Claims, 10 Drawing Sheets

ROW UNIT MOUNTING SYSTEM

CROSS-REFERENCE TO RELATED APPLICATIONS

This application claims the benefit of U.S. Provisional Application No. 63/058,646, filed Jul. 30, 2020, which is hereby incorporated by reference in its entirety.

FIELD OF THE DISCLOSURE

The present disclosure relates generally to planter row units.

BACKGROUND OF THE DISCLOSURE

Planters are farming implements that are conveyed over an area, such as a field, and operate to deposit seeds in furrows formed in the ground. Generally, planters are drawing through a field by a tractor and, more particularly, are towed behind the tractor through the field. Planters may include one or more row units used to deposit seeds in a row as the planter is drawn through a field.

SUMMARY OF THE DISCLOSURE

A first aspect of the present disclosure is directed to an agricultural implement. The agricultural implement may include a frame and a row unit removably coupled to the frame. The frame may include a laterally-extending toolbar; a first rail secured to the toolbar and extending at least partially along a length of the toolbar; and a second rail secured to the toolbar and extending at least partially along the length of the toolbar.

A second aspect of the present disclosure is directed to an agricultural implement. The agricultural implement may include a frame and row unit removably coupled to the frame. The frame may include a laterally-extending toolbar comprising a first side; a first laterally-extending rail extending from the first side; and a second laterally-extending rail extending from the first side. The row unit may include first mounting features receivable onto the first rail; and second mounting features receivable onto the second rail. The second mounting features may be pivotable between a first position in which the second mounting features are disengaged with the second rail and a second position in which the second mounting features are engaged with the second rail.

A further aspect of the present disclosure is directed to a method of coupling a row unit to an agricultural implement. The method may include providing a frame that may include a laterally-extending toolbar. The toolbar may include a first laterally-extending rail formed along a first side of the toolbar and a second laterally-extending rail formed along the first side of the toolbar. The method may also include a row unit. The row unit may include a first mounting feature and a second mounting feature. The method may also include engaging the first mounting feature onto the first rail and moving the second mounting feature relative to the first mounting feature from a first position in which the second mounting feature is disengaged with the second rail to a second position in which the second mounting feature is engaged with the second rail.

The various aspects may include one or more of the following features. The first mounting feature may include at least two laterally offset first mounting features receivable onto the first rail. The second mounting feature may include at least two laterally offset second mounting features receivable onto the second rail. The first rail and the second rail may be provided on or extend from a common side of the toolbar. The first mounting feature may include a first tab, and the second mounting feature may include a second tab. The second tab may be pivotable relative to the first tab. The second tab may be pivotable about an axis that is perpendicular to a direction that is parallel to a length of the second rail. The second tab may be slidable relative to the first tab. The first rail may include a plurality of aligned rails extending along the toolbar. The second rail may include a plurality of aligned rails extending along the toolbar. The row unit may be laterally positionable along the toolbar when the second mounting feature is disengaged with the second rail. The second mounting feature may include an anti-rotation feature that engages a portion of the toolbar to prevent rotation of the second mounting relative to the toolbar. The anti-rotation feature may include a flange.

The various aspects may also include one or more of the following features. The row unit may be laterally positionable along the frame when the second mounting features are disengaged from the second rail. The row unit may include a plurality of row units. The second mounting features may be pivotable about respective axes that are perpendicular to the first side of the toolbar. The row unit may include a first locking system configured to lockingly secure the second mounting features to a sidewall of the second slot. The implement may include a second locking system configured to lockingly secure the first mounting features to a sidewall of the first slot. Engaging the first mounting feature with the first rail may include supporting the row unit from the frame. The second mounting feature may be secured to a sidewall of the second rail.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure is directed to agricultural implements, systems, and methods for assembling agricultural implements. Particularly, the present disclosure is directed to agricultural planters and methods of assembling agricultural planters. However, the scope of the present disclosure is not limited to agricultural planters. Rather, the present disclosure is applicable to other types of agricultural implements, such as implements that are used to install, treat, or otherwise address crops arranged in rows. The agricultural implements may be adapted to receive row units, such as planter row units in the context of a planter, that are removably couplable to the implement. As an example, the present disclosure is applicable to seeders, sprayers, and tillage equipment. Still further, the scope of the disclosure may be applicable to assembly of machines outside of the agricultural arts. The scope of the present disclosure is intended to encompass all such applications.

The present disclosure is made in the context of agricultural planters and the assembly thereof. However, these are provided merely as examples and are not intended to limit the scope of the disclosure. Rather, as explained above, the scope of the present disclosure is intended to encompass any implement or device, whether within the agricultural arts or otherwise, to which the assembly systems and methods apply.

Benefits of the present disclosure include improved assembly processes and reduced assembly time. For example, access to a single side of the agricultural implement, as opposed to both fore and aft sides, is provided.

Further, time to assemble and associated labor costs are also reduced as a result of the coupling arrangement between the implement frame and the coupled row units. Consequently, the present disclosure provides for an implements having improved coupling arrangements that reduce assembly time and cost.

Figure 1:
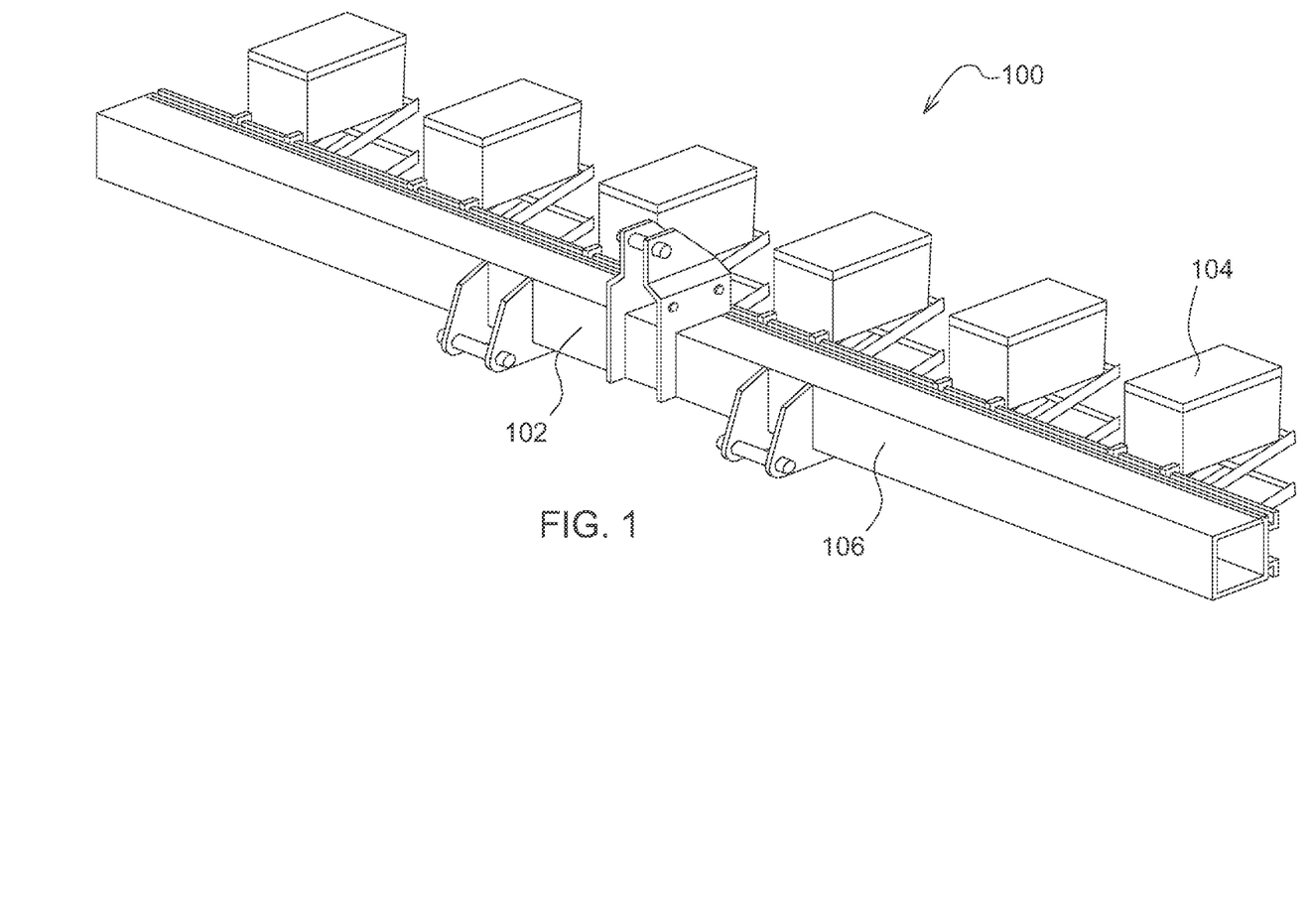
FIG. 1 is a perspective view of an example agricultural planter, according to some implementations of the present disclosure.

FIG. 1 shows an example agricultural planter 100. The planter 100 includes a frame 102 and a plurality of planter row units 104 coupled to the frame 102. The frame 102 includes a laterally-extending beam or toolbar 106, and the planter row units 104 are coupled to the toolbar 106 at various locations along the toolbar 106.

Figure 2:
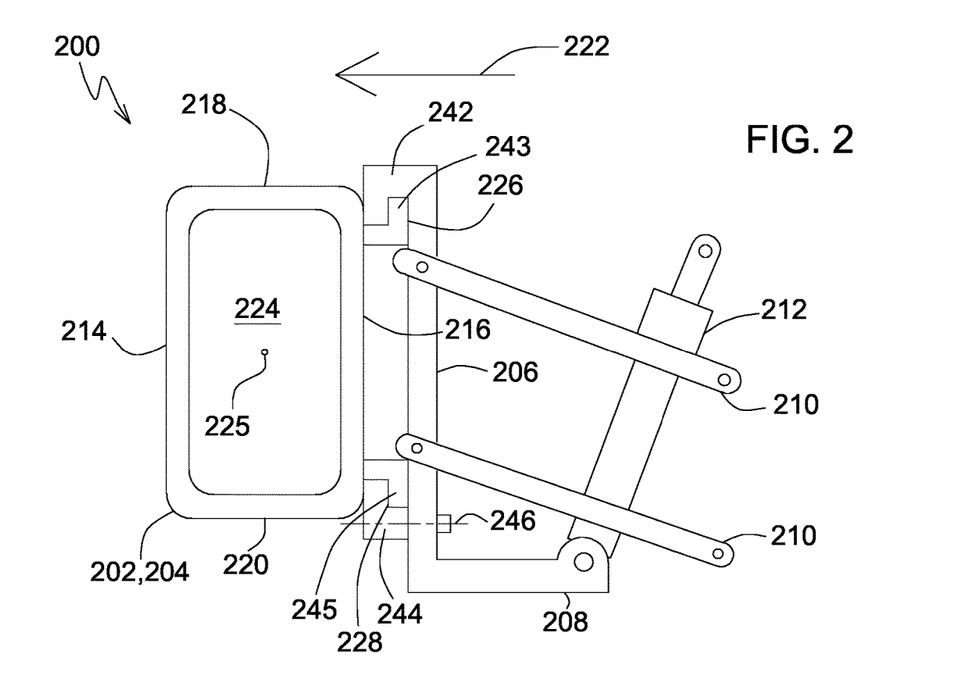
FIG. 2 is a side view of a portion of an example agricultural planter, according to some implementations of the present disclosure.

FIG. 2 is a side view of a portion of an example agricultural planter 200. Some portions of the planter 200 are omitted from FIG. 2 for the purposes of clarity. The planter 200 includes a frame 202 that includes a laterally-extending toolbar 204. A planter row unit 206 is coupled to the toolbar 204 of the frame 202. A portion of a frame 208, links 210, and an actuator 212 of the planter row unit 206 are illustrated with the remainder of the planter row unit 206 omitted for the purposes of clarity. Although a single planter row unit 206 is illustrated, it is to be understood that the planter 200 may have a plurality of planter row units 206 laterally arranged along one or more sides of the toolbar 204, in one or more configurations, e.g., in a staggered arrangement. For example, the planter row units 206 may be arranged in a staggered relationship to form crop rows having a twin row configuration. In other implementations, the planter row units 206 may be arranged uniformly along the toolbar 204 to form crop rows having uniform spacing. Still further, planter row units 206 may be attached to the toolbar 204 in any desired arrangement.

In the illustrated example, the toolbar 204 includes opposing vertical sides 214 and 216 that extend between opposing horizontal sizes 218 and 220. The terms "vertical" and "horizontal" are applied in the context of the planter 200 being positioned on level ground and in an orientation intended for normal operation. Arrow 222 indicates a direction in which the planter 200 is normally conveyed during a planting operation or otherwise being transported. As shown in FIG. 2, the planter row unit 206 is attached at the side 216 of the toolbar 204.

In the illustrated example, the toolbar 204 has a rectangular cross-sectional shape and a central channel 224 extending therethrough. However, it is within the scope that the toolbar 204 may have any have other cross-sectional shapes. For example, in some implementations, the toolbar 204 may have a cross-sectional shape corresponding to another type of quadrilateral (such as square or trapezoidal). In other implementations, the toolbar 204 may have a cross-sectional shape that is polygonal, circular, elliptical, or any other type of cross-sectional shape.

Although FIG. 2 illustrates a planter row unit 206 being coupled in a trailing configuration (i.e., a configuration in which the planter row unit 206 extends rearwardly from the toolbar 204), the toolbar 204 may be configured to permit one or more planter row units 206 to be attached in a leading configuration. That is, planter row units 206 may be attached to the toolbar 204 and extend in a forward direction from the toolbar 204. The forward direction would be a direction opposite the direction in which the planter row unit 206 extends as shown in FIG. 2. In still other implementations, a toolbar 204 may be configured to include one or more planter row units 206 that extend both in the forward direction and in the rearward direction. The toolbars 600 and 700 shown in FIGS. 6 and 7, respectively, provide for such coupling of planter row units in both the forward and rearward directions.

Figure 3:
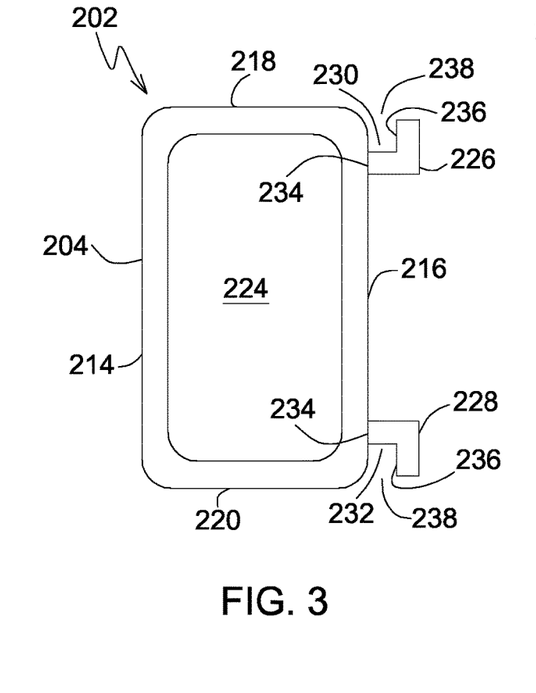
FIG. 3 is a side view of a toolbar forming part of a planter frame of the agricultural planter of FIG. 2.
Figure 4:
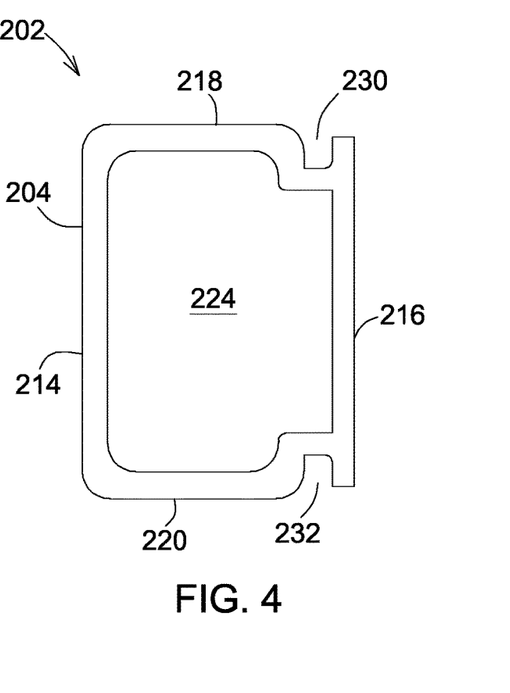
FIG. 4 is a side view of an example toolbar of an agricultural planter, according to some implementations of the present disclosure.

Referring to FIGS. 2 and 3, the frame 202 includes a first rail 226 and a second rail 228 that are coupled to the toolbar 204 along the side 216 to form respective slots 230 and 232. Although the first and second rails 226 and 228 are included to define slots 230 and 232, respectively, the slots 230 and 232 may be incorporated in other ways. For example, as shown in FIG. 4, in some implementations, the toolbar 204 may have the slots 230 and 232 formed in respective sides 218 and 220. In some implementations, the slots 230 and 232 may be integrally formed into the toolbar 204, such as by extrusion, or may be machined into the toolbar 204. In still other implementations, the slots 230 and 232 may be incorporated in any number of other ways and are intended to be within the scope of the present disclosure. In still other implementations, the slots 230 and 232 may be omitted.

The rails 226 and 228, as well as the other rails described herein, define and extend along respective axes. In the example of FIG. 2, the rails 226 and 228 define axes that extend perpendicular to the plane defined in FIG. 2. In some implementations, an axis defined by a rail may be parallel with a longitudinal axis of a toolbar. For example, in the example of FIG. 2, the rails 226 and 228 define axes that are parallel to a longitudinal axis 225 of the toolbar 204. In other implementations, axes defined by the rails and a longitudinal axis of a toolbar may be nonparallel.

Referring again to FIG. 3, the rails 226 and 228 have an "L-shaped" cross-section. In the illustrated example, ends 234 of the rails 226 and 228 are attached to the side 216, such as by welding, adhesive, fasteners, a combination of these, or any other type of attachment method. In other implementations, the rails 226 and 228 may be integrally formed in the toolbar 204. The slots 230 and 230 are formed between the sidewalls 236 of the rails 226 and 228 and the side 216. The slots 230 and 232 have openings 238. In some implementations, the opening 238 have a horizontal orientation and extend along sides 218 and 220, respectively. In some implementations, the opening 228 are parallel to the sides 218 and 220, respectively. With the planter 200 positioned on level ground and oriented to operate as intended, the slot 230 is configured to receive a portion of the planter row unit 206 in a vertical direction.

Figure 5:
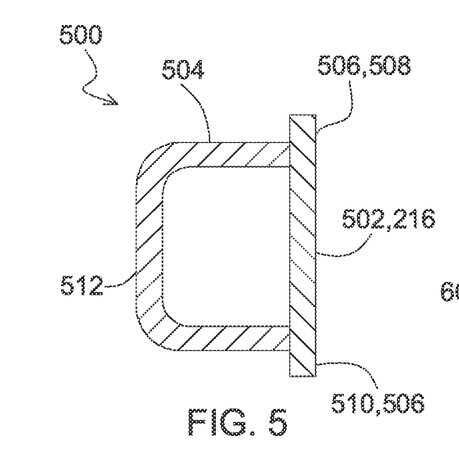
FIGS. 5-9 are cross-sectional view of example toolbars of an agricultural planters, according to some implementations of the present disclosure.

In other implementations, a toolbar of the planter frame may have one or more rails having other configurations. For example, FIGS. 5 through 9 show other implementations of rails incorporate into a planter frame. FIG. 5 is a cross-section of an example toolbar 500. The toolbar 500 is formed from a panel 502, which may be in the form of a plate, and a C-channel 504. The panel 502 and the C-channel 504 may be combined using, for example, welding, fasteners, an adhesive, or combination of these. Other joining methods may also be used. Further, in other implementations, the toolbar 500 may be integrally formed, such as by extrusion.

In FIG. 5, end portions 506 of the panel 502 form the rails 508 and 510. In this example, a side 512 of the C-channel 504 disposed opposite the panel 502 does not include end portions. Thus, the side 512 excludes rails, precluding attachment of a planter row unit to the side 512.

Figure 6:
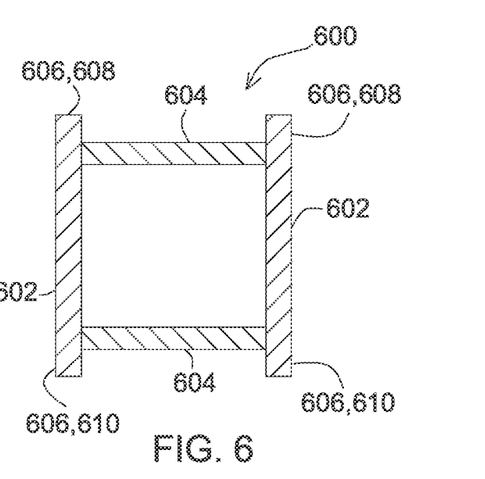

FIG. 6 is a cross-section of another example toolbar 600. The toolbar 600 is constructed using parallel panels 602 and parallel panels 604 extending between the panels 602. In other implementations, the toolbar 600 may be integrally formed, such as by extrusion. End portions 606 of the panels 602 extend beyond the panels 604 and form rails 608 and 610 to which one or more planter row units, such as planter row units 606, may be secured. As shown, the rails 608 and 610 are provided on both panels 602 and provide mounting locations for one or more planter row units.

Figure 7:
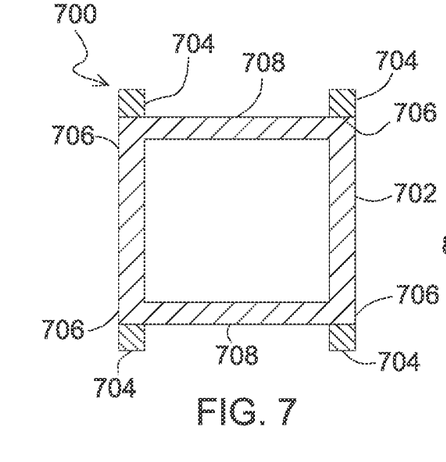

FIG. 7 is a cross-sectional view of another example toolbar 700. The toolbar 700 includes a rectangular or square cross-sectional shaped center portion 702 along with rails 704 attached at corners 706 of the center portion 702. The rails 704 extend perpendicularly from sides 708 of the center portion 702 and provide mounting locations for one or more planter row units. The rails 704 may be secured to the center portion 702 by welding, fasteners, an adhesive, a combination of these, or other types of joining methods.

It is noted that the example toolbars 500, 600, and 700 shown in FIGS. 5, 6, and 7, respectively, omit slots operable to receive mounting features, such as a portion of mounting tabs (described in more detail below) of one or more planter row units for mounting the planter row units to the respective toolbars 500, 600, and 700. Thus, slots as described, for example, in the context of FIGS. 2, 3, 9, 10, and 11 may be omitted while still permitting one or more planter row units to be mounted to the toolbars. Although tabs, such as tabs 242 and 244 (described in more detail below) and adjustable components, such as adjustable component 2000 (described in more detail below), are provided as example mounting features, other types of mounting features are within the scope of the present disclosure.

Figure 8:
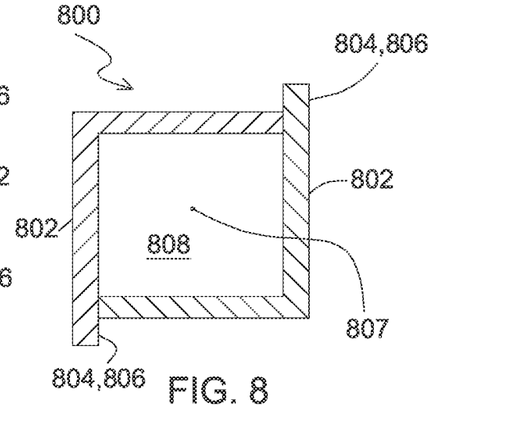

FIG. 8 is a cross-sectional view of another example toolbar 800. The toolbar 800 may be formed by combining two L-shaped portions 802, with one of the L-shaped portion 802 oriented 180° relative to the other L-shaped portion 802. Again, though, the toolbar 800 may be formed integrally, such as by extrusion. The two L-shaped portions 802 are attached such that an end portion 804 of each L-shaped portion 802 extending beyond the other L-shaped portion 802. The end portions 804 define rails 806 to which one or more planter row units may be coupled. Further, the cross-sectional shape of the toolbar 800 is such that a 180° rotation of the toolbar about a longitudinal axis 807 of center channel 808 results in an identical configuration as that shown in FIG. 8.

Figure 9:
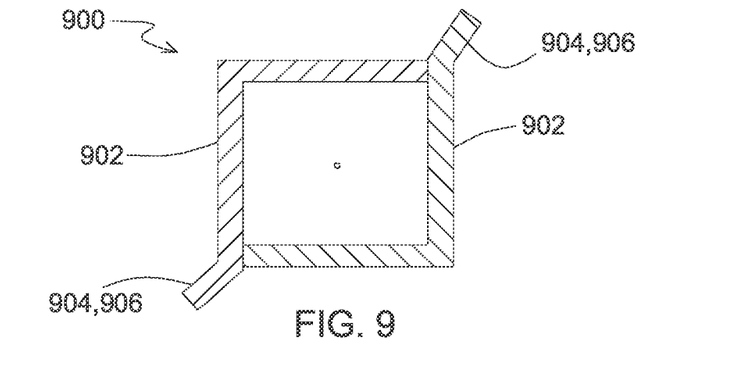

FIG. 9 is a cross-sectional view of another example toolbar 900 that has a similar construction as that of toolbar 800. However, the L-shaped portions 902 of toolbar 900 include oblique end portions 904 that extend beyond the adjacent L-shaped portion at an oblique angle to form the rails 906 to which one or more planter row units may be coupled.

As shown in FIGS. 2-9, each of the toolbars 204, 500, 600, 700, 800, and 900 includes at least one rail to which one or more planter row units may be coupled. For example, one or more portions of a planter row unit may be received onto the rail or rails formed on the toolbars. The coupled planter row unit(s) may be moved along the rail or rails of the toolbar to a desired location along the toolbar. Once in a desired location, the planter row unit may be secured to the desired location along the rail or rails such that the planter row unit is prevented from lateral movement along the rail or rails.

Figure 19:
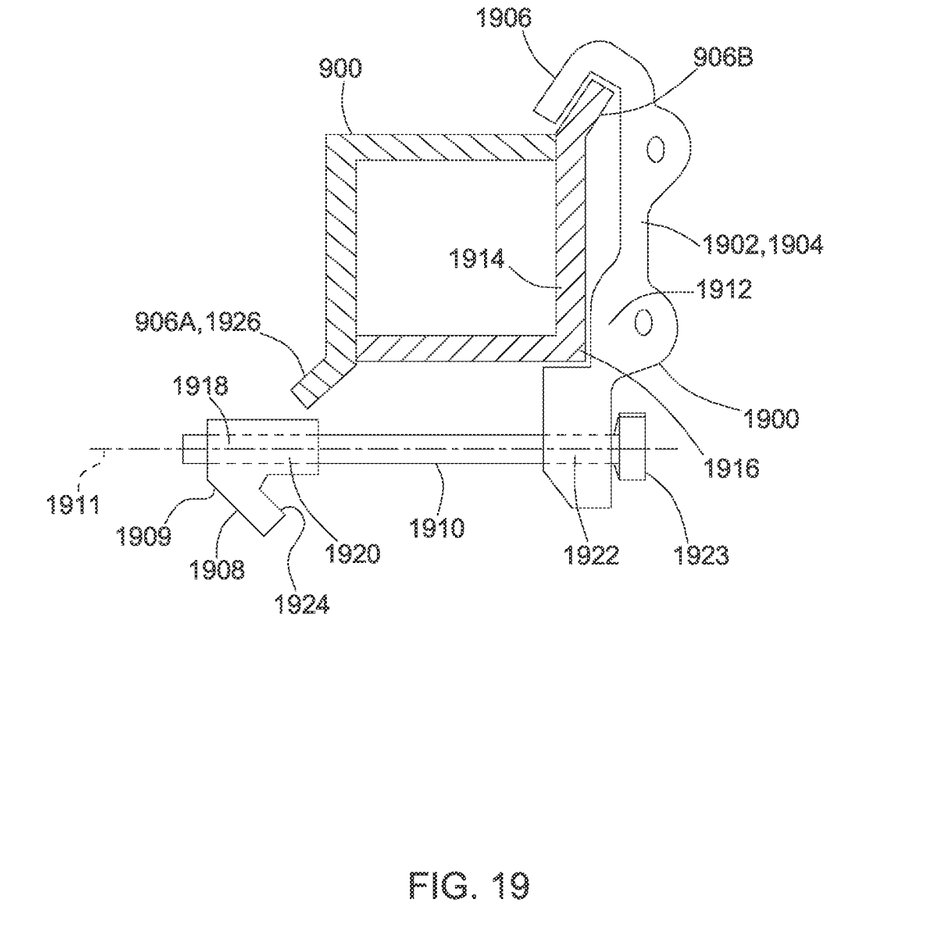
FIG. 19 is a cross-sectional view of the example toolbar of FIG. 9 with a frame portion of a planter row unit coupled thereto.

FIG. 19 is a cross-sectional view of the example toolbar 900 of FIG. 9 onto which a planter row unit 1900 is coupled. A portion of a frame 1902 of the planter row unit 1900 is shown. The frame 1902 includes a base 1904, a first tab 1906 formed on the base 1904, a second tab 1908, and a coupler 1910 extending from the base 1904. The second tab 1908 is formed on an adjustable component 1909 that is disposed on the coupler 1910. The adjustable component 1909 is another example mounting feature within the scope of the present disclosure. The coupler 1910 is operable releasably to engage the second tab 1908 to a counterpart rail 906A of the toolbar 900. The adjustable component 1909 is movable along a length of the coupler 1910, and, in some implementations, the adjustable component 1909 is also rotatable on the coupler 1910 about a longitudinal axis 1911 of the coupler 1910.

The first tab 1906 engages a counterpart rail 906B formed on the toolbar 900, allowing the planter row unit 1900 to rest on the toolbar 900. With the planter row unit 1900 resting on the toolbar 900, the adjustable component 1909 may be positioned so that second tab 1908 engages the rail 906A to fasten the planter row unit 1900 securely to the toolbar 900.

In the illustrated example, a portion 1912 of the base 1904 contacts a portion 1914 of the toolbar 900 adjacent a corner 1916 thereof. In other implementations, the base 1904 may contact the toolbar 900 at another location or at multiple locations. Contact between the portion 1912 of the base 1904 and the portion 1914 of the toolbar 900 when the first tab 1906 is engaged with the rail 906B may place the planter row unit 1900 into a desired orientation on the toolbar 900. The desired orientation may facilitate engagement of the second tab 1908 with the rail 906A.

In some implementations, the coupler 1910 may be a fastener, such as a bolt, a rod, shaft, or other component adapted to releasably engage the second tab 1908 with the rail 906A. In the illustrate example, the coupler 1910 includes a threaded portion 1918 that engages a threaded bore 1920 formed in the adjustable component 1909. The coupler 1910 also extends through a bore 1922 formed in the base 1904. The coupler 1910 includes a flange or head 1923 on an end of the coupler 1910 opposite the threaded portion 1918. The head 1923 has a cross-sectional size that is greater than a cross-sectional size of the bore 1922. The coupler 1910 is rotatable within the bore 1922.

With the first tab 1906 engaged with the rail 906B, the second tab 1908 is oriented so that a surface 1924 formed on the second tab 1908 is adjacent to and aligned with a mating surface 1926 formed on the rail 906A. In some implementations, the second tab 1908 may be brought into engagement with the rail 906A such that the surfaces 1924 and 1926 contact each other. The coupler 1910 is then rotated in a first rotational direction until, for example, a desired amount of tension is imparted to the coupler 1910 thereby securing the planter row unit 1900 to the toolbar 900. In other implementations, a position of the second tab 1908 relative to the rail 906A may be maintained as the coupler 1910 is rotated in the first rotational direction, causing the surface 1924 of the second tab 1908 to be brought into contact with the surface 1926 of the rail 906A. The coupler 1910 may be rotated until the desired amount of tension is imparted to the coupler 1910. The coupler 1910 may be rotated in a second rotational direction, opposite the first rotational direction, in order to release the second tab 1908 from the rail 906A and planter row unit 1900 from the toolbar 900.

Figure 20:
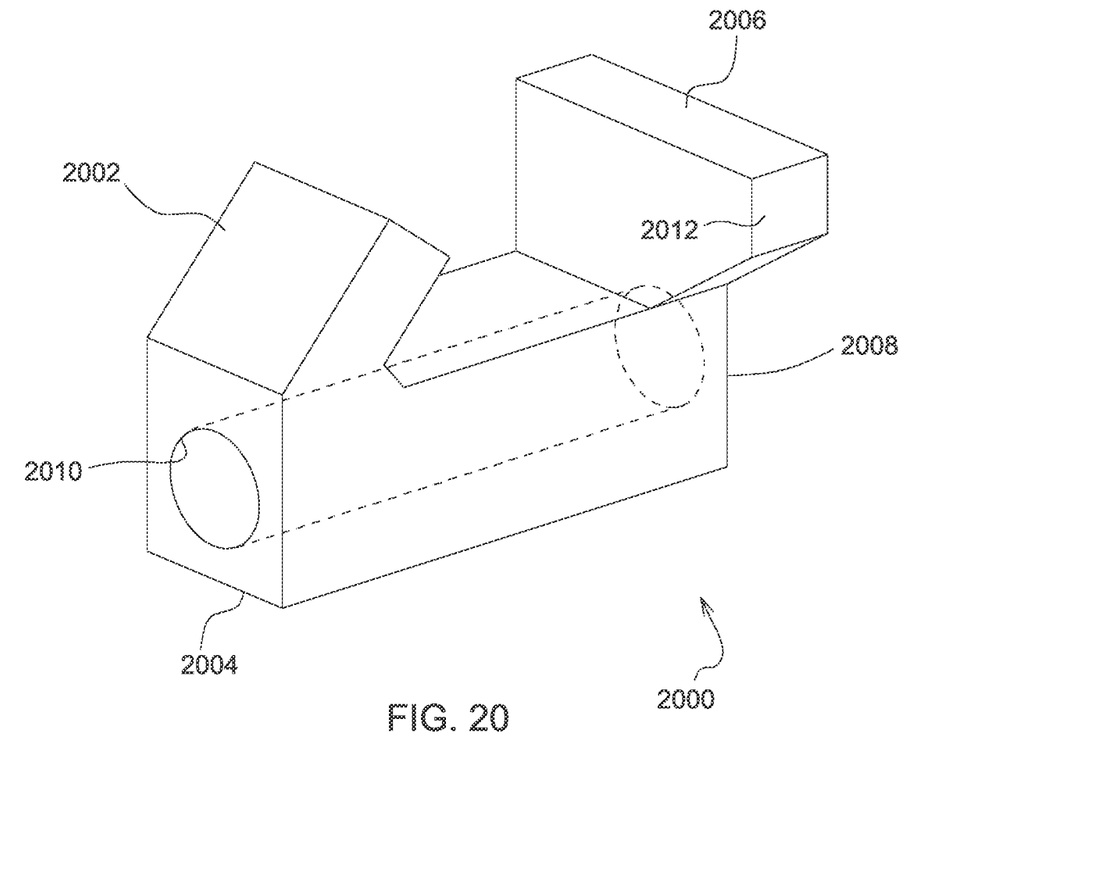
FIG. 20 is a perspective view of an example adjustable component for securing a device, such as a planter row unit, to a toolbar, according to some implementations of the present disclosure.

FIG. 20 is a perspective view of another adjustable component 2000 for use with a coupler, such as coupler 1910 and coupler 2116, discussed in more detail below. The adjustable component 2000 is another example mounting feature within the scope of the present disclosure. The adjustable component 2000 includes an inclined tab 2002 located at a first end 2004 and a flange 2006 located at a second end 2008, opposite the first end 2004. A bore 2010 extends through the adjustable component 2000 and receives a coupler, such as coupler 1910 and 2116. The bore 2010 is threaded and engages with a threaded surface of the coupler. As a result of the mating threads, relative rotational movement between the adjustable component 2000 and the coupler results in longitudinal movement of the adjustable component 2000 relative to the coupler.

As explained below, the inclined tab 2002 functions to engage a rail formed on a toolbar to secure a planter row unit thereto. The flange 2006 engages a side of a toolbar to maintain an orientation of the adjustable component 2000 relative to the toolbar. Absent the flange 2006, an orientation of the adjustable component 2000 may change as a result of the forces applied by the inclined tab 2002 to a rail of the toolbar and vice versa. These forces may tend to rotate the adjustable component 2000 relative to the toolbar. Engagement between the flange 2006 and a side of the toolbar counteracts this rotational tendency of the adjustable component 2000. Thus, the flange 2006 forms an anti-rotation feature that operates to prevent rotation of the adjustable component 2000 as the adjustable component 2000 is moved relative to a rail of a toolbar. Although flange 2006 illustrates an example of an anti-rotation feature that operates to maintain the adjustable component 2000 in a selected orientation relative to a toolbar, such as toolbar 2100, or rail of a toolbar, such as rail 2102, in other implementations, other types of anti-rotation features may be used.

The flange 2006 includes a laterally extending portion 2012. The laterally extending portion 2012 provides an increased area of contact between the flange 2006 and a side of a toolbar, thereby increasing stability of an engagement between the adjustable component 2000 and the toolbar.

Figure 21:
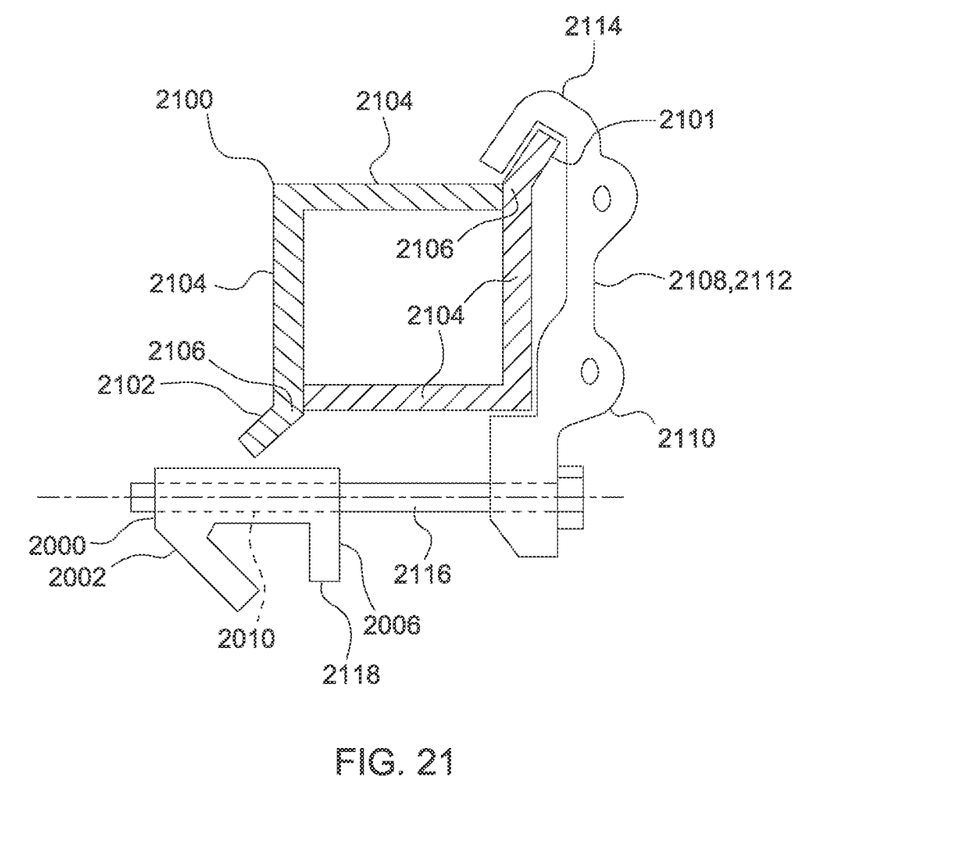
FIGS. 21 and 22 are cross-sectional views of an example toolbar with a frame of a planter row unit in two states during assembly of the planter row unit to the toolbar, according to some implementations of the present disclosure.

FIG. 21 is a cross-sectional view of an example toolbar 2100. As shown, the cross-sectional shape of the toolbar 2100 is similar to the cross-sectional shape of the toolbar 900, shown in FIGS. 9 and 19. The toolbar 2100 include rails 2101 and 2102 that form an oblique angle relative to sides 2104 of the toolbar 2100. The rails 2102 are located at opposing corners 2106 and extend longitudinally along all or a portion of a length of the toolbar 2100. A frame 2108 of a planter row unit 2110 couples to the toolbar 2100 via the rails 2101 and 2102 in a manner similar to that described above with respect to FIG. 19 in order to secure the planter row unit 2110 to the toolbar 2100.

A portion of the frame 2108 of the planter row unit 2100 includes a base 2112, a tab 2114 formed on the base 2112, a coupler 2116 extending from the base 1904, and the adjustable component 2000 shown in FIG. 20. The coupler 2116 extends through threaded bore 2010 of the adjustable component 2000. The adjustable component 2000 is threadably engaged with the coupler 2116 such that relative rotation of the adjustable component 2000 and the coupler 2116 produces relative longitudinal movement between the adjustable component 2000 and the coupler 2116.

FIG. 21 illustrates an assembly condition in which the tab 2114 is engaged with rail 2101 and in which inclined tab 2002 is not engaged with rail 2102. The illustrated condition may correspond with an initial assembly step in which the planter row unit 2110 is rested on the toolbar 2000 as a result of engagement between the tab 2002 and rail 2101 and prior to engagement of the adjustable component 2000 to the rail 2102. As shown, an abutting surface 2118 of the flange 2006 is directed away from side adjacent side 2104, and the inclined tab 2002 is similarly disengaged from the rail 2102.

Figure 22:
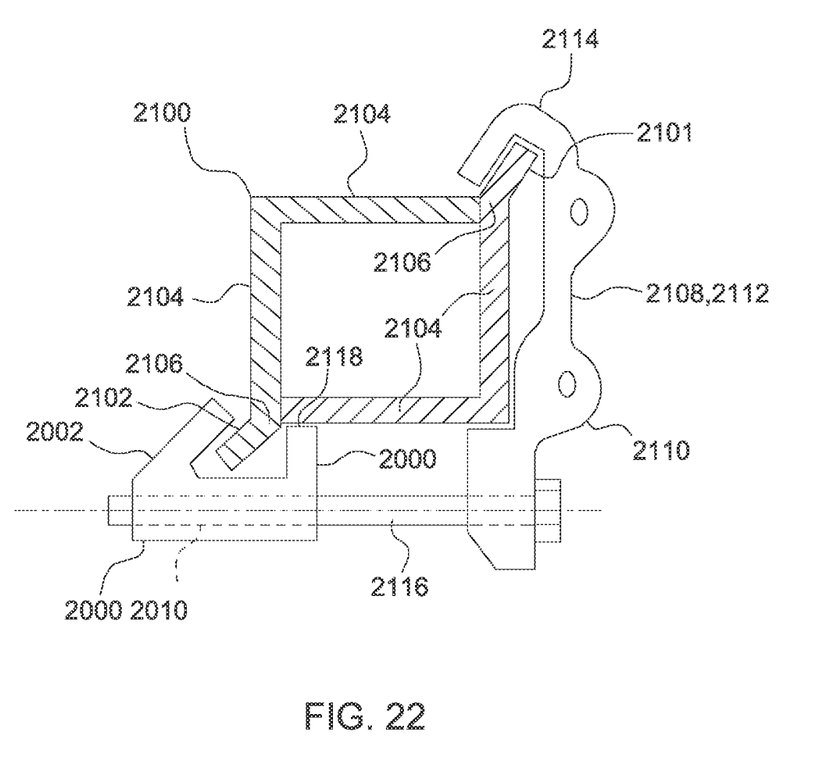

FIG. 22 shows the adjustable component 2000 rotated approximately 180 compared to that shown in FIG. 21 such that the inclined tab 2002 is now oriented in a manner to engage the rail 2102 and in which the abutting surface 2118 of the flange 2006 is in contact with the side 2104 adjacent the flange 2006. As the coupler 2116 is rotated in a first rotational direction, the adjustable component 2000 is drawn towards the rail 2102 to securely fasten the planter row unit 2110 to the toolbar 2100. Rotation of the coupler 2116 in a second direction, opposite the first direction, displaces the adjustable component 2000 from the rail 2102, releasing the inclined tab 2002 from the rail 2102.

Figure 10:
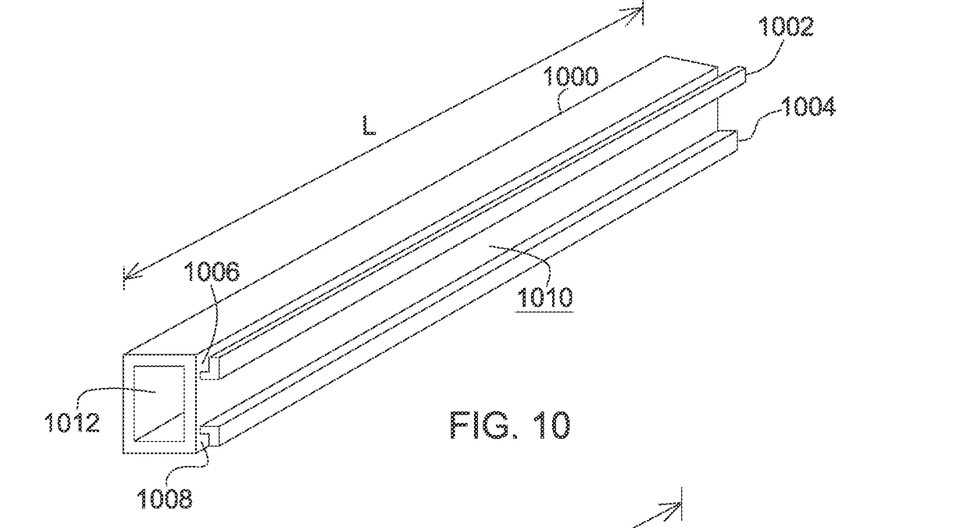
FIG. 10 is a perspective view of a toolbar of an agricultural frame of an agricultural planter that includes continuous rails for mounting one or more planter row units, according to some implementations of the present disclosure.

FIG. 10 is a perspective view of an example toolbar 1000. The toolbar 1000 may similar to toolbar 204. The toolbar 100 includes continuous rails 1002 and 1004, slots 1006 and 1008, a side 1010 to which the rails 1002 and 1006 are attached, and a central channel 1012. The rails 1002 and 1004 extend along an entirety of the length L of the toolbar 1000. In other implementations, one or both of the rails 1002 and 1004 may extend along less than an entirety of the length L of the toolbar 1000.

Figure 11:
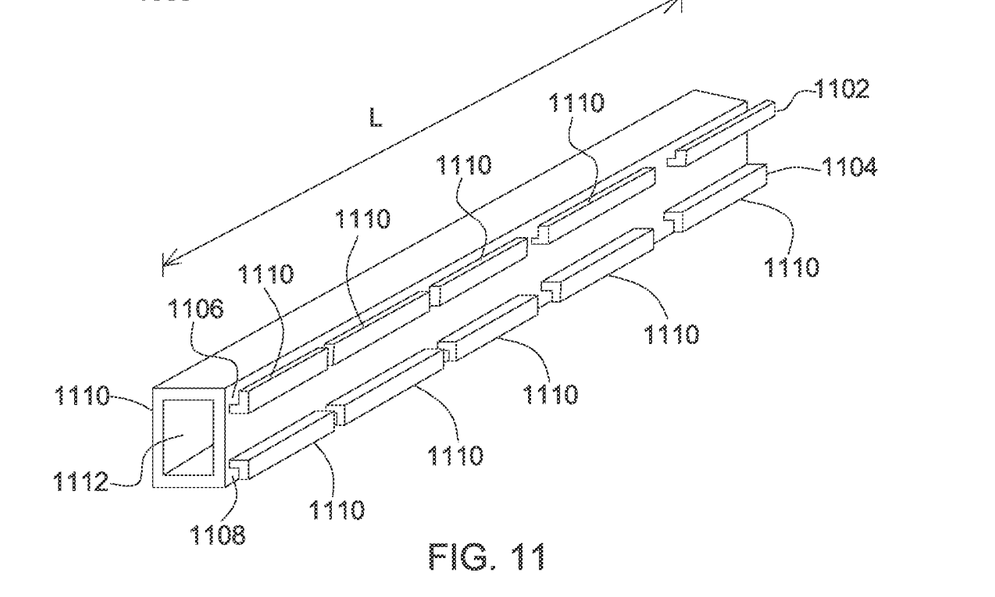
FIG. 11 is a perspective view of a toolbar of an agricultural frame of an agricultural planter that includes discontinuous rails for mounting one or more planter row units, according to some implementations of the present disclosure.

FIG. 11 is a perspective view of another example toolbar 1100 in which the rails 1102 and 1104 and, consequently, slots 1106 and 1108 are divided up into segments 1110. Although both rails 1102 and 1104 are shown as being divided into segments 1110, in other implementations, one of the rails 1102 and 1104 may be segmented while the other of the rails 1102 and 1104 may be continuous. Further, in other implementations, a portion of one or both of the rails 1102 and 1104 may be continuous, while another portion of one or both of the rails 1102 and 1104 may be segmented. Thus, in some implementations, one or both of the rails 1102 and 1104 may be discontinuous. In some implementations, the segments 1110 may be sized to receive a single planter row unit. In other implementations, the segments 1110 may be sized to receive more than one planter row unit. A central channel 1112 extends through the toolbar 1100.

In some implementations, the rails included on a planter frame, e.g., rails 226 and 228, (and, where present, the associated slots, e.g., slots 230 and 232) provide for coupling one or more planter row units thereto. Further, the rails (and slots, where applicable) allow for laterally sliding the planter row units in order to place the planter row units in a desired position along the toolbar. For example, the rails, whether continuous or segmented, provide for convenient positioning of the planter row units along the toolbar of a planter frame without the need to access an opposing side of the toolbar. For example, as shown in FIG. 2, access to side 214 is unnecessary to mount and position the planter row unit 206 along the rails 226 and 228 of the toolbar 204. As mentioned earlier, planter row units may be located along the toolbar with uniform spacing between adjacent planter row units. In other implementations, one or more planter row units may be positioned in a non-uniform manner along the toolbar. In still other instances, some planter row units mounted to the rails may be uniformly distributed along the toolbar while other planter row units may be nonuniformly distributed along the toolbar. Thus, the rails allow planter row units to be positioned along the toolbar in any desired configuration.

Returning to FIG. 2, the planter row unit 206 includes mounting tabs 242 and 244 that are received onto the rails 226 and 228, respectively, in order to mount the planter row unit 206 to the toolbar 204 and, hence, the frame 202. As shown, the tabs 242 and 244 define recesses 243 and 245, respectively, that are configured to receive the rails 226 and 228, respectively. Again, although tabs 242 and 244 are described, other types of mounting features may be used and are within the scope of the present disclosure. In the illustrated implementation of FIG. 2, the tabs 242 and 244 are also received into the respective slots 230 and 232. However, in other implementations, the slots 230 and 232 may be omitted and the mounting tables 242 and 244 may be mounted to the rails 226 and 228 exclusively. FIGS. 5-9 show various toolbars that omit slots. Although tabs are described as examples both in the context of FIG. 2 and other figures described herein, other types of mounting features are also within the scope of the present disclosure and can be used to couple a row unit to a toolbar.

The mounting tabs 242 and 244 may be movable relative to each other. For example, in some implementations, the mounting tab 244 may be pivotable about an axis 246 relative to the frame 208 and, hence, the mounting tab 242. FIGS. 12-15 are detail views of the planter 200 in which the mounting tab 244 is pivotable on the frame 208 of the planter row unit 206 relative to the counterpart mounting tab 242, which is fixed on the frame 208 and, in some implementations, forms an integral part of frame 208.

Figure 12:
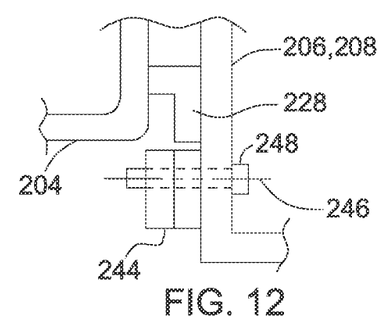
FIGS. 12-15 are detail side and front views of an example agricultural planter, according to some implementations of the present disclosure.
Figure 13:
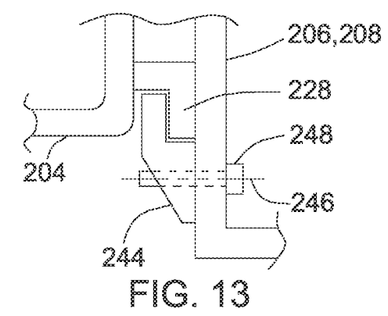
Figure 14:
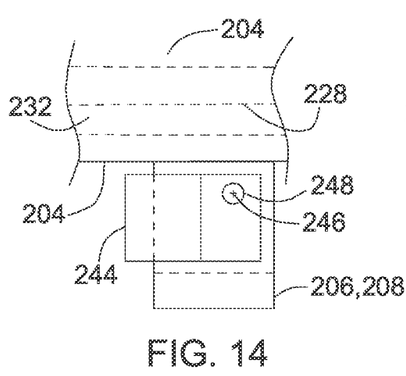
Figure 15:
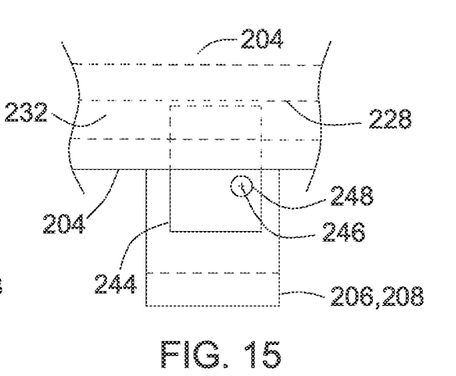

FIGS. 12 and 13 show the mounting tab 244 in a first position. With the mounting tab 244 in the first position, the planter row unit 206 may be installed onto the toolbar 204 by having the mounting tab 242 received onto the rail 226. In this example, the mounting tab 226 is also received into the slot 230, as shown in FIG. 2. Again, though, the slots 230 and 232 may be omitted. With the tab 242 received onto the rail 226, the planter row unit may be allowed to freely rest on the toolbar 204 as a result of the interlocking relationship between the tab 244 and the rail 226. As a result, a person assembling the planter row unit 206 to the toolbar 204 is able to release the planter row unit, freeing the person to perform other tasks, such as pivoting the mounting tab 244 about axis 246 into a second position in which the mounting tab 244 is received onto the rail 228 and, in this example, in the slot 232.

In some implementations, the mounting tab 244 may be pivotable about axis 246 on a bolt 248 or other threaded component. The bolt may be threadably received through the mounting tab 244 by mating threads formed in the mounting tab 244. With the mounting tab 244 pivoted into the second position, the bolt 248 may be tightened such that the mounting tab 244 is tightened against the inner surface 236 to secure the mounting tab 244 to the rail 228 and, hence, to the toolbar 204. With the bolt 248 tightened, the frame 206 may be prevented from moving on the rail 228 and, hence, along the toolbar 204. In some implementations, the mounting tab 242 may be similarly pivotably mounted to the frame 206 by a bolt or other threaded component threaded into the mounting tab 242. With the mounting tab 242 received onto the rail 226, the bolt may be tightened to secure the mounting tab 242 to the rail 226 and, hence, the toolbar 204.

With this type of coupling between the planter row unit 206 and the toolbar 204, installing the planter row unit 206 may be performed by a single person using fewer component compared to conventional mounting. Further, access to the side 214 of the toolbar 204 is avoided, making installation less laborious and time intensive.

Although a single mounting tab 242 and mounting tab 244 are shown, a planter row unit may include two or more mounting tabs 242, two or more mounting tabs 244, or both. For implementations having two or more mounting tabs 242, the mounting tabs 242 may be laterally offset from each other and laterally aligned such that the mounting tabs 242 are received onto the rails 226 together and to provide the planter row unit 206 a desired orientation when coupled to the toolbar 204. Similarly, the planter row unit 206 may include two or more mounting tabs 244 that are laterally aligned and laterally offset. Each of the mounting tabs 244 may be pivotable relative to the frame 206 and receivable onto the rail 228 when pivoted into the second position, as described above.

Figure 16:
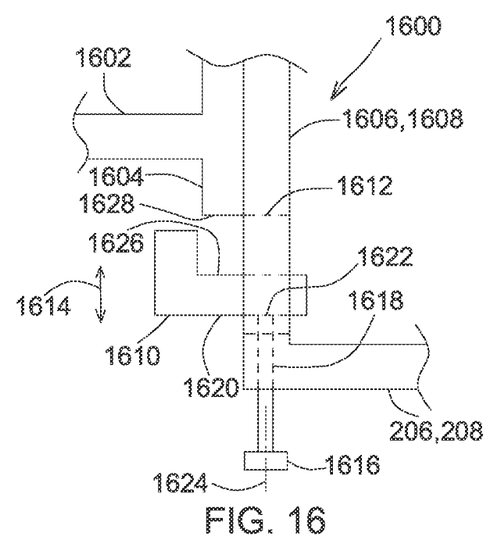
FIGS. 16-17 are detail side and front views of another example agricultural planter, according to some implementations of the present disclosure.
Figure 17:
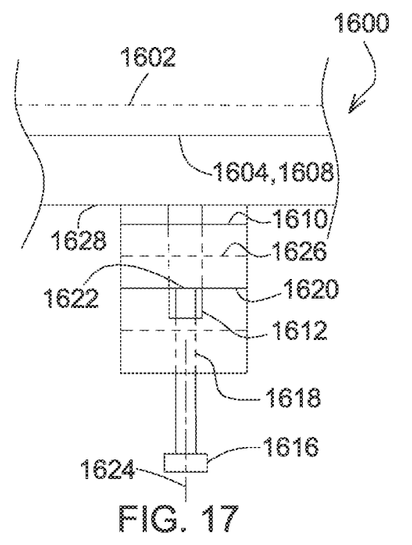

In other implementations, the mounting tab 244 may be movable on the frame 208 in other ways. For example, the mounting tab 2044 may be slidable on the frame 206 relative to the mounting tab 242. FIGS. 16 and 17 are detail views of another example planter 1600. The planter 1600 includes a toolbar 1602 that includes a rail 1604 extending along the toolbar 1602 while omitting a corresponding slot. For example, the toolbar 1602 may be similar to toolbar 500 shown in FIG. 5. A planter row unit 1606 is mounted to the toolbar 1602 via a frame 1608. The frame 1608 includes a mounting tab 1610. The mounting tab 1610 is received into a slot 1612 formed in the frame 1608 and is slidable along the frame 1608 in a slot 1612. The mounting tab 1610 is slidable in the slot 1612 in the direction of arrow 1614. In the illustrated example, the arrow 1614 corresponds to a vertical direction. However, in other implementations, the slot 1612 may be oriented in a direction other than vertical.

The frame 1608 also includes a threaded component 1616, such as a bolt, that is threadably received into a threaded bore 1618 formed in the frame 1608. A surface 1620 of the mounting tab 1610 is adapted to abut an end 1622 of the threaded component 1616. Rotation of the threaded component 1616 about axis 1624 in a first direction is operable to move the mounting tab 1610 towards the rail 1604, while rotation of the threaded component in a second direction, opposite the first direction, about axis 1624 is operable to displace the mounting tab 1610 away from the rail 1604.

With the planter row unit 1606 supported from the toolbar 1602, for example, as described above, the threaded component 1616 is operable to move the mounting tab 1610 within the slot 1612 towards engagement with the rail 1604 to secure the planter row unit 1602 to the toolbar 1602. Engagement between the mounting tab 1610 and the rail 1604 may include contact between a surface 1626 of the mounting tab 1610, opposite surface 1620, and an end surface 1628 of the rail 1604. The threaded component 1616 is also operable to move the mounting tab 1610 away from the rail 1604 to disengage with the rail 1604. In some implementations, the planter row unit 1606 may be secured to the rail 1604 (and the toolbar 1602) by a single mounting tab 1610. In other implementations, the frame 1608 may include two or more mounting tabs 1610, and the planter row unit 1606 may be secured to the rail 1604 (and the toolbar 1602) by two or more mounting tabs 1610.

Still further, in some implementations, a surface 1630 formed on the mounting tab 1610 and a corresponding surface 1632 formed on the rails 1604 may define mating tapered surfaces. As the mounting tab 1610 is moved toward the rail 1604, the tapered surfaces 1630 and 1632 engage to form a wedged connection between the mounting tab 1610 and the rail 1604 to securely attach the planter row unit 1606 to the toolbar 1602.

Figure 18:
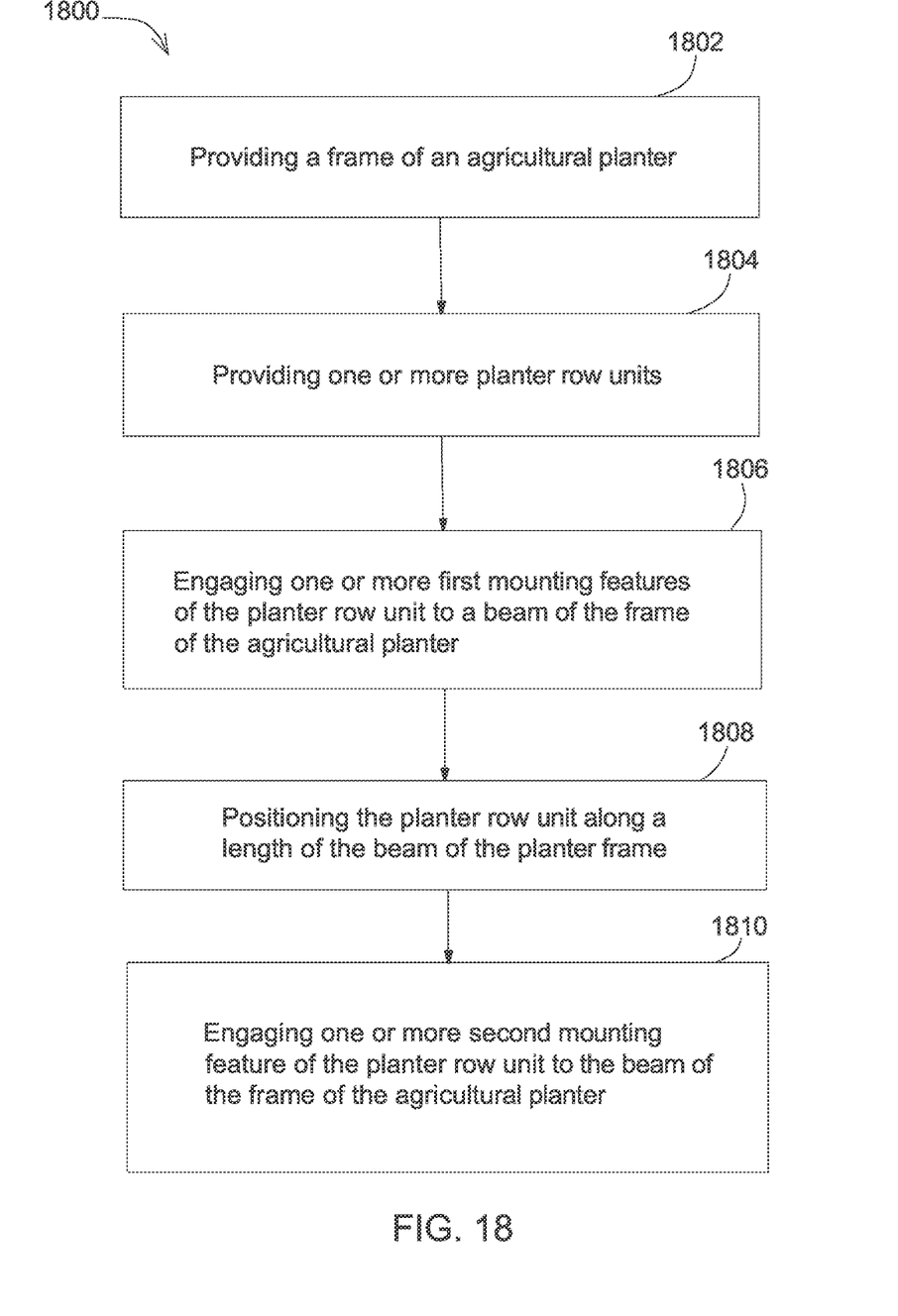
FIG. 18 is an example method for coupling a planter row unit to a frame of an agricultural planter.

FIG. 18 is an example method 1800 for coupling a planter row unit to a planter frame. At 1802, a frame from a planter, such as frame 202 of planter 200, is provided. At 1804, one or more planter row units, such as planter row unit 206 is provided. The planter row unit includes mounting features, such as mounting tabs 242 and 244. At 1806, one or more first mounting features of the planter row unit engages a toolbar of the planter frame. For example, the one or more first mounting features may be engaged with a first rail of the toolbar. Engagement between the first rail and the one or more first mounting features allows the planter row unit to be coupled to the toolbar of the planter frame without input or support from an outside source. For example, in some instances, the planter row frame may include a first set of mounting tabs that are received onto a first rail formed on the toolbar of the planter frame. Engagement between the first set of mounting tabs and the rail may allow the planter row unit to rest from the toolbar without additional support. Thus, once resting from the toolbar, a user may perform other tasks, such as engaging a second set of mounting tabs to complete attachment of the planter row unit to the toolbar of the planter frame.

At 1808, with the mounting features engaging the rail, the planter row unit is moved along the length of the toolbar to a desired position. At 1810, one or more second mounting features is engaged with the toolbar. For example, the one or more second mounting features may be engaged with a second rail provided on the toolbar. In some implementations, the one or more second mounting features may be pivoted on the planter row unit relative to the first mounting features to secure the planter row unit to the planter frame. In other implementations, the one or more second mounting features may be slid or otherwise linearly displaced along the planter row unit into engagement with the second rail to secure the planter row unit to the planter frame. Securing the planter row unit to the planter frame may also include tightening a threaded component, such as a fastener, to cause a surface of the one or more mounting features to become clamped into engagement with a surface of the second rail, such as a sidewall of the second rail. In some implementations, the one or more first mounting features may also be clamped into engagement with a surface of the rail to secure the planter row unit to the planter frame. Further, the first rail and the second rail may be provided at a common side of the toolbar.

Without in any way limiting the scope, interpretation, or application of the claims appearing below, a technical effect of one or more of the example embodiments disclosed herein is a reduce in cost, time, and labor associated with installing a planter row unit to an agricultural planter frame.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. An agricultural implement comprising:
 a frame comprising:
  a laterally-extending toolbar;
  a first rail secured to the toolbar and extending at least partially along a length of the toolbar; and
  a second rail secured to the toolbar and extending at least partially along the length of the toolbar; and
 a row unit removably coupled to the frame, the row unit comprising:
  a first mounting feature receivable onto the first rail; and
  a second mounting feature receivable onto the second rail, the second mounting feature movable between a first position in which the second mounting feature is disengaged with the second rail and a second position in which the second mounting feature is engaged with the second rail,
 wherein the second mounting feature is pivotable relative to the first mounting feature.

2. The agricultural implement of claim 1, wherein the first mounting feature comprises at least two laterally offset first mounting features receivable onto the first rail.

3. The agricultural implement of claim 1, wherein the second mounting feature comprises at least two laterally offset second mounting features receivable onto the second rail.

4. The agricultural implement of claim 1, wherein the first rail and the second rail are provided on or extend from a common side of the toolbar.

5. The agricultural implement of claim 1, wherein the first mounting feature comprises a first tab and wherein the second mounting feature comprises a second tab.

6. The agricultural implement of claim 5, wherein the second tab is slideable relative to the first tab.

7. The agricultural implement of claim 1, wherein the second mounting feature is pivotable about an axis that is perpendicular to a direction that is parallel to a length of the second rail.

8. The agricultural implement of claim 1, wherein the first rail comprises a plurality of aligned rails extending along the toolbar.

9. The agricultural implement of claim 8, wherein the second rail comprises a plurality of aligned rails extending along the toolbar.

10. The agricultural implement of claim 1, wherein the row unit is laterally positionable along the toolbar when the second mounting feature is disengaged with the second rail.

11. The agricultural implement of claim 1, wherein the second mounting feature comprises an anti-rotation feature that engages a portion of the toolbar to prevent rotation of the second mounting relative to the toolbar.

12. The agricultural implement of claim 11, wherein the anti-rotation feature comprises a flange.

13. An agricultural implement comprising:
a frame comprising:
a laterally-extending toolbar comprising a first side;
a first laterally-extending rail extending from the first side; and
a second laterally-extending rail extending from the first side;
a row unit removably coupled to the frame, the row unit comprising:
a first mounting feature receivable onto the first rail; and
a second mounting feature receivable onto the second rail, the second mounting feature being pivotable between a first position in which the second mounting feature is disengaged with the second rail and a second position in which the second mounting feature is engaged with the second rail.

14. The agricultural implement of claim 13, wherein the row unit is laterally positionable along the frame when the second mounting feature is disengaged from the second rail.

15. The agricultural implement of claim 13, wherein the row unit comprises a plurality of row units.

16. The agricultural implement of claim 13, wherein the second mounting feature is pivotable about an axis that is perpendicular to the first side of the toolbar.

17. The agricultural implement of claim 13, wherein the row unit further comprises a first locking system configured to lockingly secure the second mounting feature to a sidewall of the second slot.

18. The agricultural implement of claim 17, wherein the implement further comprises a second locking system configured to lockingly secure the first mounting feature to a sidewall of the first slot.

19. A method of coupling a row unit to an agricultural implement, the method comprising:
providing a frame comprising:
a laterally-extending toolbar comprising:
a first laterally-extending rail formed along a first side of the toolbar; and
a second laterally-extending rail formed along the first side of the toolbar;
providing a row unit comprising:
a first mounting feature; and
a second mounting feature;
engaging the first mounting feature onto the first rail; and
pivoting the second mounting feature relative to the first mounting feature from a first position in which the second mounting feature is disengaged with the second rail to a second position in which the second mounting feature is engaged with the second rail.

20. The method claim 19, wherein engaging the first mounting feature with the first rail comprises supporting the row unit from the frame.

21. The method of claim 19, further comprising securing the second mounting feature to a sidewall of the second rail.

* * * * *